United States Patent
Barzaghi et al.

(10) Patent No.: US 8,090,891 B2
(45) Date of Patent: Jan. 3, 2012

(54) METHOD OF PROVIDING COMMUNICATION IN DISTRIBUTED SYSTEMS

(75) Inventors: Giorgio Barzaghi, Vaprio d'Adda (IT); Giacomo Mirelli, Carugate (IT); Vincenzo Rodella, Melzo (IT)

(73) Assignee: Alcatel Lucent, Paris (FR)

( * ) Notice: Subject to any disclaimer, the term of this patent is extended or adjusted under 35 U.S.C. 154(b) by 1655 days.

(21) Appl. No.: 10/006,583

(22) Filed: Dec. 10, 2001

(65) Prior Publication Data

US 2002/0078279 A1    Jun. 20, 2002

(30) Foreign Application Priority Data

Dec. 19, 2000 (IT) .................................. MI00A2741

(51) Int. Cl.
*G06F 13/14* (2006.01)

(52) U.S. Cl. ........................................ 710/305; 370/389

(58) Field of Classification Search .......... 710/305–311, 710/313; 370/389, 392
See application file for complete search history.

(56) References Cited

U.S. PATENT DOCUMENTS

| | | | | |
|---|---|---|---|---|
| 6,496,860 B2 * | 12/2002 | Ludtke et al. | ................ | 709/223 |
| 6,693,532 B2 * | 2/2004 | Capowski et al. | ............ | 340/506 |
| 6,728,244 B1 * | 4/2004 | Takabatake | .................. | 370/392 |
| 6,728,821 B1 * | 4/2004 | James et al. | ................. | 710/306 |
| 6,779,004 B1 * | 8/2004 | Zintel | ........................ | 709/227 |
| 6,895,444 B1 * | 5/2005 | Weisshaar et al. | ............ | 709/250 |
| 6,925,513 B1 * | 8/2005 | Clark | ........................... | 710/104 |
| 2002/0141418 A1 * | 10/2002 | Ben-Dor et al. | ............. | 370/398 |

* cited by examiner

*Primary Examiner* — Clifford Knoll
(74) *Attorney, Agent, or Firm* — Sughrue Mion, PLLC

(57) ABSTRACT

Described is a method of providing the communication between two or more control units of a control apparatus that controls at least one electronic device which comprises two or more peripheral units. The method is characterized by comprising the steps of: providing a common bus; connecting said two or more control units by way of said common bus; controlling, through each control unit, at least one peripheral unit of the device to provide data necessary for the operation of the peripheral unit and to detect possible data variation of said peripheral unit; and providing for a master controller connected to the common bus, and further by the steps, carried out by each of said control units, of submitting to said master controller, information related to data consumed and to data provided by the peripheral units controlled by said control units; and sending a message over the bus whenever at least one of the data provided by the peripheral units controlled by said control units changes.

13 Claims, 2 Drawing Sheets

METHOD OF PROVIDING COMMUNICATION IN DISTRIBUTED SYSTEMS

INCORPORATION BY REFERENCE OF PRIORITY DOCUMENT

This application is based on, and claims the benefit of, Italian Patent Application No. MI2000A002741 filed on Dec. 19, 2000, which is incorporated by reference herein.

BACKGROUND OF THE INVENTION

1. Field Of The Invention

The present invention relates to a method of controlling electronic devices such as for instance apparatus which receive, transmit and process signals in telecommunications radio link systems. In particular it concerns a distributed application protocol, namely a method of providing the communication between two or more control units.

2. Description Of The Prior Art

Recently, the use of distributed control systems is becoming more and more imperative in those fields where the control of complex systems is required. Therefore, a demand arises as to the definition of application layer communication protocols/methods that support such control methodology and that utilize at best the resources and services that are available from lower layers, already developed by third parties.

The known application layer protocols contemplate the use of complete hardware solutions, or they have been developed expressly for special types of microcontrollers. Moreover, in order to be able to realize complex control systems with distributed data, they are not employable in architectures that use microcontrollers with reduced system resources.

Further, such protocols, for the transmission of data of the system under control, require that connections be established by utilizing specific services. This results in a greater complexity of implementation and in a greater data transfer time.

Other protocols, which do not utilize such data transfer modes, provide for a negotiation between the entities that have to exchange a data item to determine the format and the identification of the message to be utilized.

An example of electronic device that must be controlled and supervised could be an apparatus that receives, transmits and processes signals in telecommunications radio link systems. In such apparatus it is necessary to control the alarms that are possibly generated, it is necessary to collect and analyze the various operating states and carry out configurations.

SUMMARY OF THE INVENTION

It is the main object of the present invention to provide a method of effectively managing the communication between a plurality of controlled entities, each controlled entity comprising a controller.

It is a further object of the present invention to provide a method of effectively managing the communication between a plurality of controlled entities and a controlling entity.

It is a further object of the present invention to provide a method of controlling the correct communication between the plurality of controlled entities and the controlling entity.

These and other object are achieved by an application layer method of managing the communication between entities which is not connection-oriented but is of connectionless type.

The method in accordance with the invention has the characteristics set forth in the independent claim 1. Further advantageous characteristics of the method are set forth in the dependent claims. All the claims are intended to be an integral part of the present description.

The invention will certainly result in being clear having read the following detailed description, given by way of example and not of limitation, to be read with reference to the attached drawings.

BEST MODE FOR CARRYING OUT THE INVENTION

Figure 1:
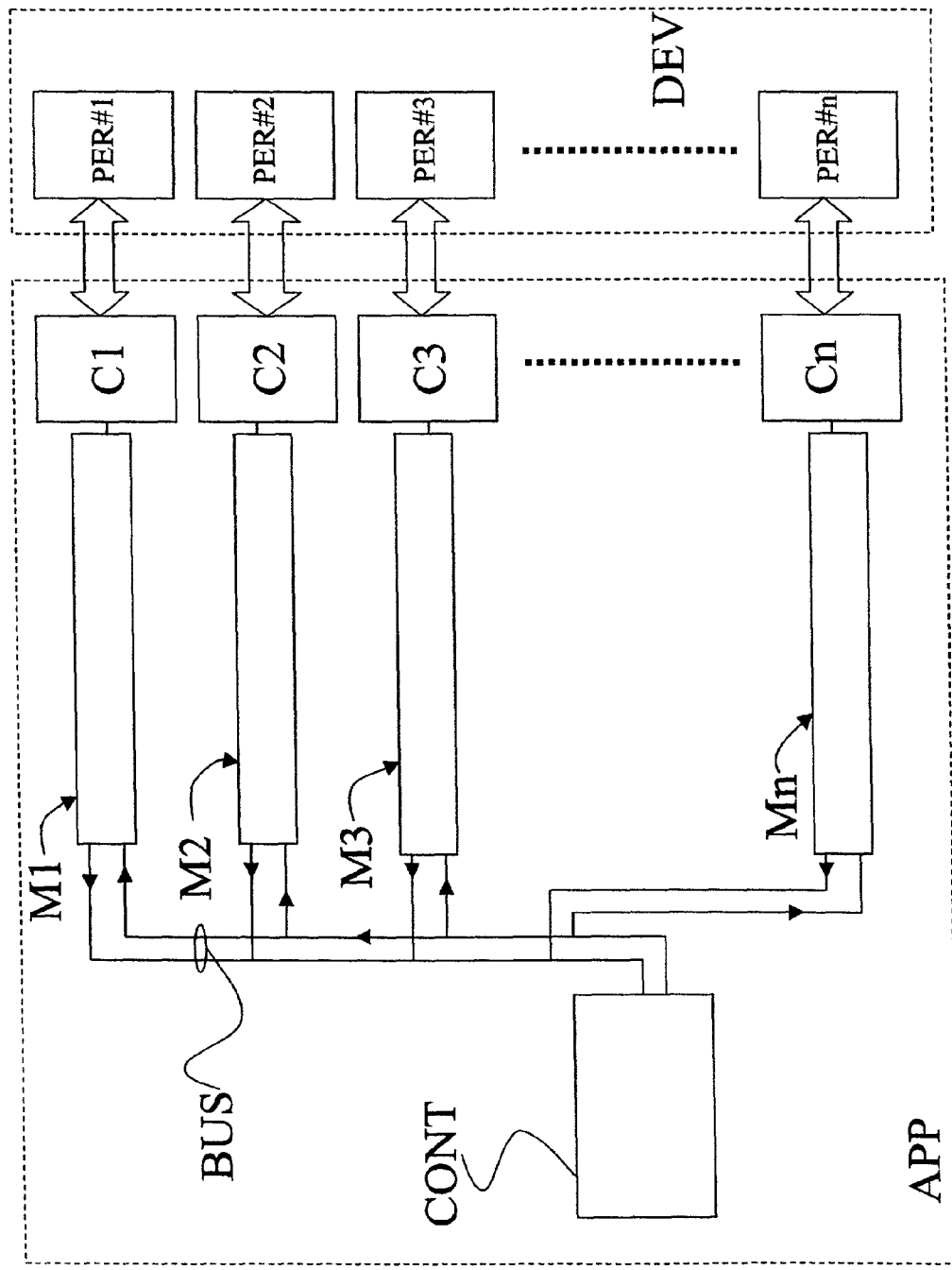
FIG. 1 schematically shows the configuration of the apparatus for implementing the present invention.
Figure 2:
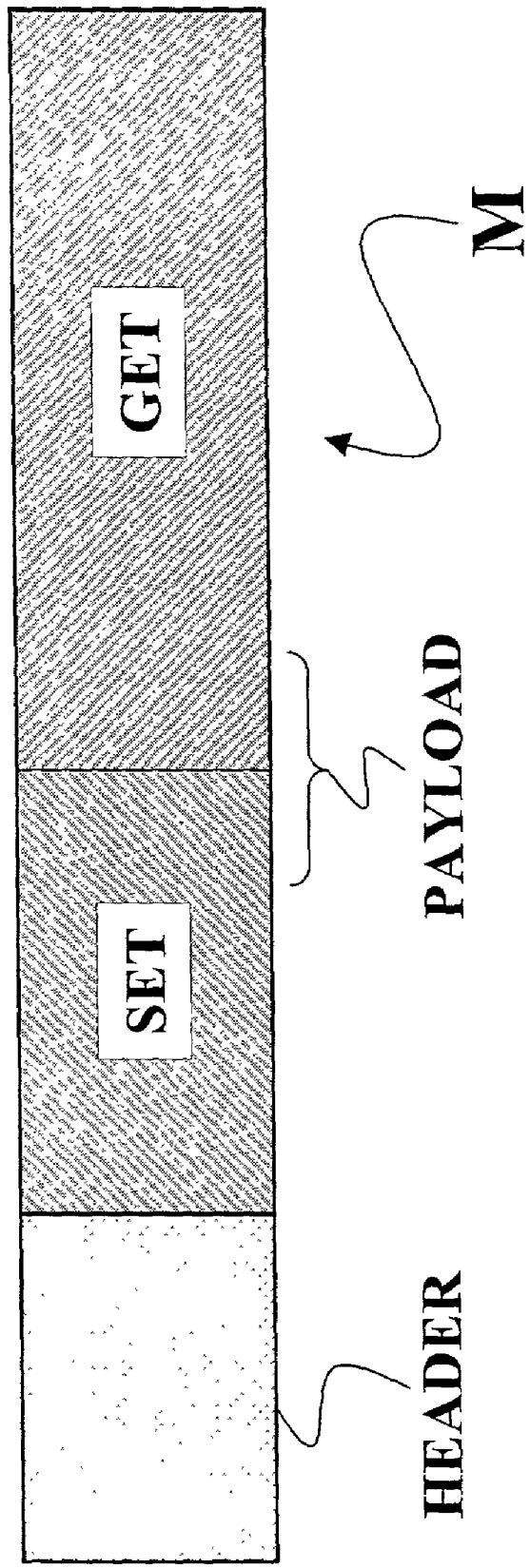
FIG. 2 shows the structure of the messages that are exchanged according to the present invention.

The method according to the present invention applies to a device to be controlled (DEV) which comprises a plurality of peripheral units (PER #1, . . . , PER # n). Associated with each peripheral unit (PER # 1, . . . , PER # n) is a control unit (C1, . . . , Cn) of a control apparatus (APP). The various control units are connected through a common bus (BUS) which is also connected to a master controller (CONT). The master controller (CONT) in turn controls the control units (C1, . . . , Cn).

For purposes of the present invention, every control unit will be defined as agent unit while the master control unit will be defined as manager unit. Therefore, the present invention provides a method of effectively managing the communication between a plurality of agents and possibly between agents and master.

According to the present invention, the various units, in order to perform the control of the device (DEV), exchange each other messages (M) containing information (I). Each message is composed of one or more registers. In turn, the information contained in every message can substantially be of two types.

The first type of information, conventionally termed "set information", is the information that an agent acquires from its peripheral unit and which it makes available to one or more of the agents connected thereto, which agents use such information to drive the respective peripheral units. A message (relating to a certain agent) may comprise set information, in the sense that it may be totally/partially occupied by set information or may not contain any set information.

The second type, conventionally termed "get information", is the information that an agent acquires from another agent and supplies to the peripheral unit associated therewith. A message (concerning a certain agent) may comprise "get information", in the sense that it may be totally/partially occupied by get information or it may not contain any get information (in this case it would contain only set information).

The first step of the method according to the invention consists in a submission step, i.e. a step in which every agent entity transmits to the manager the structure of its message (the agent communicates to the manager which part of the message is "get information" and which part is "set information"). In this way the manager is aware of both provenience and destination of the various information.

Once this step is ended, the communication step proper between the various units with related message exchange, is started. A characteristic feature of the method according to the invention is that the method does not provide for establishing connections and for this reason it is termed connectionless. In accordance with the invention, in fact, every agent spontaneously sends a message whenever it detects the variation of a data in the peripheral unit (typically one or more cards) controlled thereby, otherwise it does not send any message. The message with the "get information" at least partially modified is sent by the agent by utilizing the common bus.

A peculiarity of the method according to the present invention is that the data producer (the agent that has acquired from its own peripheral unit a modified data) shall not take care of how many (and not even of which) other agents will make use of (i.e. will "consume") the data produced thereby. The agent that consumes/uses a certain data shall not in turn take care of who has provided it with the data and of how many/which other consumer agents the same data is provided to.

The structure of the message exchanged between the various agents comprises a first portion of message and a second portion of message. The first portion of message, called header, contains specific information of the protocol for implementing the services. In addition, it contains also information related to the source of information (the agent producing the data) and information concerning the destination of the information (the data consumer agent or agents). The information concerning the destination of the information can comprise a logic address for possibly representing a group of entities consuming the same data item. Naturally, the header comprises an univocal identifier of the information so that it can be univocally recognized by all the entities.

The second message portion, called payload, contains the information proper that can be, as said above, set information and/or get information.

Optionally, the header part of the message exchanged between Entities contains control bits to keep the information exchange regularity under control.

A flow control step through a sequence counter is also provided. This control step is performed by the manager Entity through the cooperation of the various agent Entities. Every agent Entity, or the corresponding peripheral unit, comprises a counter that counts forward at each data sent. The increased value of the agent is written at a proper position into the header. Under regular (namely error-free or faultless) communication conditions, the manager will receive messages with the values increased in a progressive manner.

Under failure or simple temporary interruption of the communication conditions, the manager will receive messages with non-progressive values of the counter or it will not receive the subsequent messages (namely it will no longer receive messages with counter values greater than a certain last value). At any rate, the manager Entity will realize that at least one of the agent units is not provided with updated data. In this case the flow control step contemplates that the manager asks the agent which has not been able to send its data, to send them again into the network so that all of the units making use of such a data will be able to keep themselves updated. If the agent is not able to do so, the manager will put all the other agents' disposal the data that it anyhow has at its disposal (those as stored by it).

Therefore, according to the present invention, every agent has its own address. When an agent sends its registers (namely messages containing get/set data) it associates a header containing the address of the various agents to which that data item is to be sent, with such registers. The same data are also sent to the manager, but the peculiarity of the present invention just resides in that, once the start-up step has been performed, the manager is no longer essential to the operation.

In the event that a transmission problem arises, it is necessary to discern if the agent Entity, that is no longer able to communicate, was a purely data consumer a data producer/consumer or a purely data producer Entity. If the Entity is purely consumer, it will no longer be able to receive data from the other units but this, after all, will not adversely affect the other units. If the Entity is partially data producer and partially data consumer, the situation is more complicated since the other agent units that are ready to receive the data will not receive it: the method of the invention contemplates that these units will freeze with the last received data waiting till the situation is restored. The same situation will occur as soon as the failed (or anyhow isolated) unit is fully producer.

The present invention may advantageously be implemented through a computer program comprising program code means adapted to perform one or more steps of the method when said program is run on a computer. Therefore, the scope is intended to cover such a computer program as well as a computer readable medium having a program recorded thereon, said computer readable medium comprising computer program code means adapted to perform one or more steps of the method when said program is run on a computer.

There have thus been shown and described a novel method and a novel apparatus for controlling/supervising electronic devices, in particular transceivers for radio link systems which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method of providing communication between at least two control units of a control apparatus, said control apparatus comprising a master controller and said at least two control units connected to each other and said master controller through a common bus, wherein the control apparatus controls at least two peripheral units, wherein the method comprises the step of:
controlling the at least two peripheral units to provide data essential to the operation of the peripheral units and to detect possible data variations in the peripheral units, wherein each control unit:
submits information concerning data consumed and provided by the peripheral units controlled by the said each control unit to said master control; and
spontaneously sends a message over the bus whenever the data provided by at least one of the peripheral units varies.

2. A method according to claim 1, wherein the step of submitting information to the master controller comprises the step of each control unit transmitting to the master controller a structure of its own message comprising at least one of information provided and information received and used.

3. A method according to claim 1, wherein it further comprises the step of assigning a suitable address to each of said control units.

4. A method according to claim 1 wherein the step of spontaneously sending a message comprises sending a message comprising a first portion and a second portion, said first message portion comprising information concerning the control unit that has detected a data variation in the data of at least one peripheral unit controlled thereby and information concerning control units that will consume the data in the sent message.

5. A method according to claim 4, wherein the information concerning the control units that will consume the data in the sent message comprise a logic address for representing a group of control units consuming the same data item.

6. A method according to claim 1, wherein it comprises the additional step of providing each control unit with a counter that counts forward by a predetermined amount at each message sent by said each control unit.

7. A method according to claim 6, wherein it further comprises the step of writing the value of said counter into every message that is sent by said each control unit.

8. A method according to claim 1, wherein the step of spontaneously sending a message comprises sending a message comprising at least one control bit to control regularity of the information exchange.

9. A method according to claim 1, wherein further comprising the step of disabling said master controller after having established the communication between said control units.

10. A method according to claim 1, wherein said peripheral units are devices for receiving, transmitting and processing signals in radio link systems.

11. An apparatus for controlling two or more peripheral units, the apparatus comprising:
  at least two control units, each control unit controlling at least one peripheral unit of the device to provide data necessary for the operation of the peripheral unit and detect possible data variations of said peripheral unit;
  a common bus for connecting said two or more control units; and
  a master controller connected to the common bus,
  wherein each control unit comprises:
    means for submitting, to said master controller, information concerning data consumed and provided by the peripheral unit controlled by a respective control unit; and
    means for spontaneously sending a message in response to a variation of data provided by a peripheral unit controlled by a respective control unit.

12. An apparatus according to claim 11, wherein said peripheral units are devices for receiving, transmitting and processing signals in radio link systems.

13. A computer-readable medium having a program recorded thereon, said computer readable medium comprising computer program code adapted to perform the steps of the method according to claim 1 when said program is run on a computer.

* * * * *